(12) United States Patent
Ito

(10) Patent No.: US 9,696,946 B2
(45) Date of Patent: Jul. 4, 2017

(54) IMAGE FORMING APPARATUS AND METHOD THEREOF

(75) Inventor: Takehiro Ito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/600,760

(22) Filed: Aug. 31, 2012

(65) Prior Publication Data

US 2013/0057893 A1    Mar. 7, 2013

(30) Foreign Application Priority Data

Sep. 6, 2011  (JP) ................ 2011-194147

(51) Int. Cl.
| | |
|---|---|
| *G06F 3/12* | (2006.01) |
| *G06K 15/00* | (2006.01) |
| *H04B 5/00* | (2006.01) |
| *H04B 7/00* | (2006.01) |

(52) U.S. Cl.
CPC .......... *G06F 3/1209* (2013.01); *G06F 3/1236* (2013.01); *G06F 3/1292* (2013.01); *G06F 3/1221* (2013.01); *G06F 3/1229* (2013.01); *G06F 3/1273* (2013.01); *Y02B 60/1271* (2013.01)

(58) Field of Classification Search
None
See application file for complete search history.

(56) References Cited

U.S. PATENT DOCUMENTS

| | | | | |
|---|---|---|---|---|
| 4,994,986 | A * | 2/1991 | Cihiwsky ............... | B41J 29/393 324/765.01 |
| 5,483,649 | A * | 1/1996 | Kuznetsov et al. ............ | 726/22 |
| 2004/0095459 | A1* | 5/2004 | Russell et al. ................ | 347/240 |
| 2006/0001898 | A1* | 1/2006 | Maeshima et al. .......... | 358/1.14 |
| 2007/0018832 | A1* | 1/2007 | Beigel et al. .............. | 340/572.7 |
| 2008/0006696 | A1* | 1/2008 | Piersol ............ | G06K 19/07381 235/451 |
| 2010/0214593 | A1* | 8/2010 | Toda .................. | H04N 1/00214 358/1.14 |
| 2010/0330906 | A1* | 12/2010 | Aoki ........................... | 455/41.1 |
| 2011/0219451 | A1* | 9/2011 | McDougal et al. ........... | 726/23 |
| 2012/0110132 | A1* | 5/2012 | Ando ........................... | 709/219 |

FOREIGN PATENT DOCUMENTS

| | | |
|---|---|---|
| JP | 2007-274592 A | 10/2007 |
| JP | 2009-171187 A | 7/2009 |
| JP | 2009-302956 A | 12/2009 |

* cited by examiner

*Primary Examiner* — Moustapha Diaby
(74) *Attorney, Agent, or Firm* — Canon U.S.A., Inc. IP Division

(57) ABSTRACT

An image forming apparatus, including a storage unit wirelessly accessible from an external device, switches its operation mode related to wireless access of the image forming apparatus between an active mode in which a signal for wirelessly connecting to an external device is transmitted and a passive mode enabling access to the storage unit in response to a signal for wireless connection from an external device.

12 Claims, 12 Drawing Sheets

IMAGE FORMING APPARATUS AND METHOD THEREOF

BACKGROUND OF THE INVENTION

Field of the Invention

Aspects of the present invention relate to an image forming apparatus capable of radio-frequency identification (RFID) communication with an external device.

Description of the Related Art

Radio-frequency identification (RFID) is a non-contact wireless communication system that utilizes a radio guidance system. Recently, RFID has been employed as an authentication system in various fields, such as physical distribution management systems, user authentication systems, electronic money systems, and transport systems.

For example, in a physical distribution management system, an RFID reader/writer placed in a fixed position reads an RFID tag embedded in conveyed parts to check the type and number of the parts. In an authentication system, individual authentication can be performed such that an integrated circuit (IC) card is passed over an RFID unit in an image forming apparatus of a multifunction peripheral for logging in to the multifunction peripheral, and an RFID tag is read.

Such an RFID device includes two types, one is an active operation type that supplies power to an RFID tag that does not include a power source, and a passive operation type to which power is supplied.

An RFID tag in an IC card or the like that passively operates communicates with an external reader/writer by generating the required power internally with radio waves from the external reader/writer without having an internal battery. In contrast, an RFID device that actively operates includes a battery or the like, and performs communication by autonomously transmitting information. Japanese Patent Application Laid-Open No. 2009-302956 discusses a technique relating to an actively operating RFID device, which switches the device to a passive type when a power supply on/off detection unit detects turning off of the power supply to the RFID unit.

However, in an image forming apparatus that includes an RFID unit, just switching a device to a passive type when the power supply to the RFID unit is turned off as performed conventionally cannot be said to be appropriately switching the RFID communication method based on the situation. For example, if an active type RFID tries to communicate with an image forming apparatus in which an RFID unit is operating as the active type, various issues arise, such as communication with an radio-frequency (RF) tag being impossible due to radio wave interference.

SUMMARY OF THE INVENTION

An aspect of the present invention is directed to a system for appropriately switching between an active mode and a passive mode, which are two RFID communication methods, in an image forming apparatus.

According to an aspect of the present invention, an image forming apparatus includes a storage unit wirelessly accessible by an external device, and a switching unit configured to switch an operation mode relating to wireless access of the image forming apparatus between an active mode in which a signal for wirelessly connecting to an external device is transmitted and a passive mode that enables access to the storage unit in response to a signal for wireless connection from an external device, wherein in a state in which the image forming apparatus is operating in the active mode, the operation mode of the image forming apparatus switches to the passive mode in at least any of a case in which the image forming apparatus switches to a power saving state and a case in which the image forming apparatus is in a failure state.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
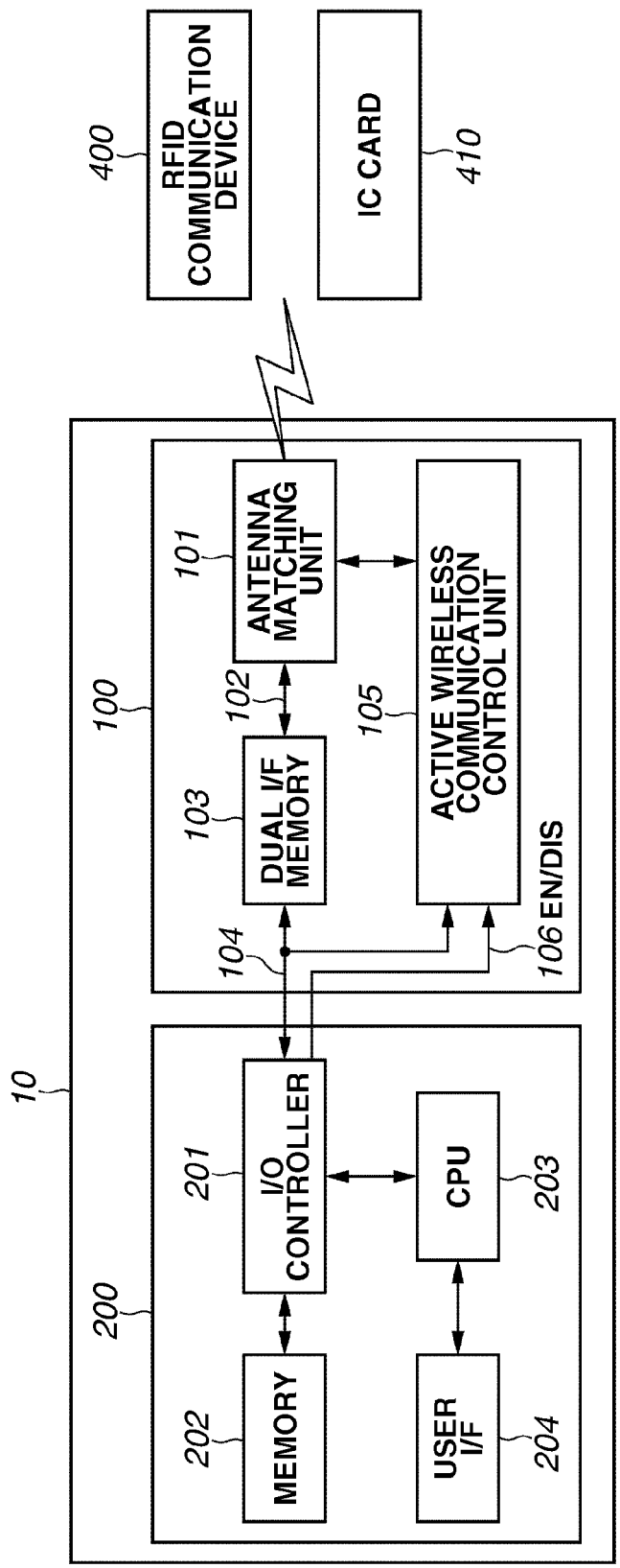
FIG. 1 is a block diagram illustrating an example of a configuration of an image forming apparatus according to a first exemplary embodiment of the present invention.

FIG. 1 is a block diagram illustrating an example of a configuration of an image forming apparatus according to a first exemplary embodiment of the present invention. Unless otherwise stated, as long as the apparatus can execute the functions of the present invention, the image forming apparatus may obviously be a single device or a system configured from a plurality of devices.

An image forming apparatus 10 is, for example, a digital multifunction peripheral (MFP). The image forming apparatus 10 includes an RFID controller 100 and a system controller 200. The image forming apparatus 10 may further include a printer unit, a scanner unit, a facsimile unit, and the like, which are not illustrated, according to its function.

The RFID controller 100 includes an antenna matching unit 101, a dual interface memory (dual I/F memory) 103, and an active wireless communication control unit 105.

The antenna matching unit 101 performs matching of RFID frequency bands, and accesses the dual I/F memory 103 based on an RF protocol 102. The RFID frequency bands are 135 KHz or less, 13.56 MHz, 2.45 GHz, 860 MHz to 960 MHz, and 433 MHz, as standardized by the International Organization for Standardization (ISO) and International Electrotechnical Commission (IEC). Examples of the devices that communicate with the RFID controller 100 include active operation devices such as an RFID communication device 400, and passive operation devices such as an integrated circuit (IC) card 410. The IC card may be an RFID communication device that passively operates. Such devices will be referred to collectively below as an "IC card". The dual I/F memory 103 is a storage device that can be accessed wirelessly by an external device (e.g., the RFID communication device 400 or IC card 410).

The RFID controller 100 can communicate based on two protocols, the RF protocol 102 and an inter integrated circuit (I2C) protocol 104. A communication line for each of these two protocols is connected to the dual I/F memory 103.

An enable/disable signal 106 is input from an input/output (I/O) controller 201 to the active wireless communication control unit 105. If the signal 106 is "enable", the active wireless communication control unit 105 supplies power to the antenna matching unit 101. In this case, the RFID controller 100 actively operates, and can communicate with the passively operating IC card 410. In other words, the image forming apparatus 10 operates in an active mode.

On the other hand, if the signal 106 is "disable", the active wireless communication control unit 105 does not supply power to the antenna matching unit 101. In this case, the RFID controller 100 passively operates, and can communicate with the actively operating RFID communication device 400. In other words, the image forming apparatus 10 operates in a passive mode. Further, in this case, as stated above, since power is not supplied to the antenna matching unit 101, communication from the RFID controller 100 side with the passively operating IC card 410 is not possible. More specifically, the signal 106 functions as a switching signal for switching the operation mode relating to RFID wireless access of the image forming apparatus 10 between the active mode for transmitting a signal for wireless connection to an external device and the passive mode for allowing access to the dual I/F memory 103 in response to a signal for wireless connection from an external device.

When power is supplied to the image forming apparatus 10 body (a state in which the image forming apparatus 10 body is turned on), the RFID controller 100 receives a power supply from the image forming apparatus 10 body, and as described above, enables communication with the passively operating IC card 410 and with the actively operating RFID communication device 400 by switching between the active mode and the passive mode. More specifically, the image forming apparatus 10 can operate by switching between an active type, in which RFID communication is performed by supplying power to a communication partner, and a passive type, in which RFID communication is performed by power being supplied from the communication partner.

However, when power is not supplied to the image forming apparatus 10 body (a state in which the image forming apparatus 10 body is turned off), the power supply from the image forming apparatus 10 body to the RFID controller 100 is cut. Consequently, power is also not supplied to the antenna matching unit 101 from the active wireless communication control unit 105, so that the RFID controller 100 operates passively.

The system controller 200 includes the I/O controller 201, a memory 202, a central processing unit (CPU) 203, and a user I/F 204. The I/O controller 201 communicates with the dual I/F memory 103 based on the I2C protocol 104. The CPU 203 performs processing of programs with respect to display on a user I/F 204 display and inputs from the user I/F 204. The I/O controller 201 is connected to the memory 202 and the CPU 203, and reads/writes data from/into the CPU 203 and the dual I/F memory 103.

The CPU 203 controls the entire image forming apparatus 10 by executing a program that is computer-readably recorded in a nonvolatile storage area of the memory 202.

Figure 2:
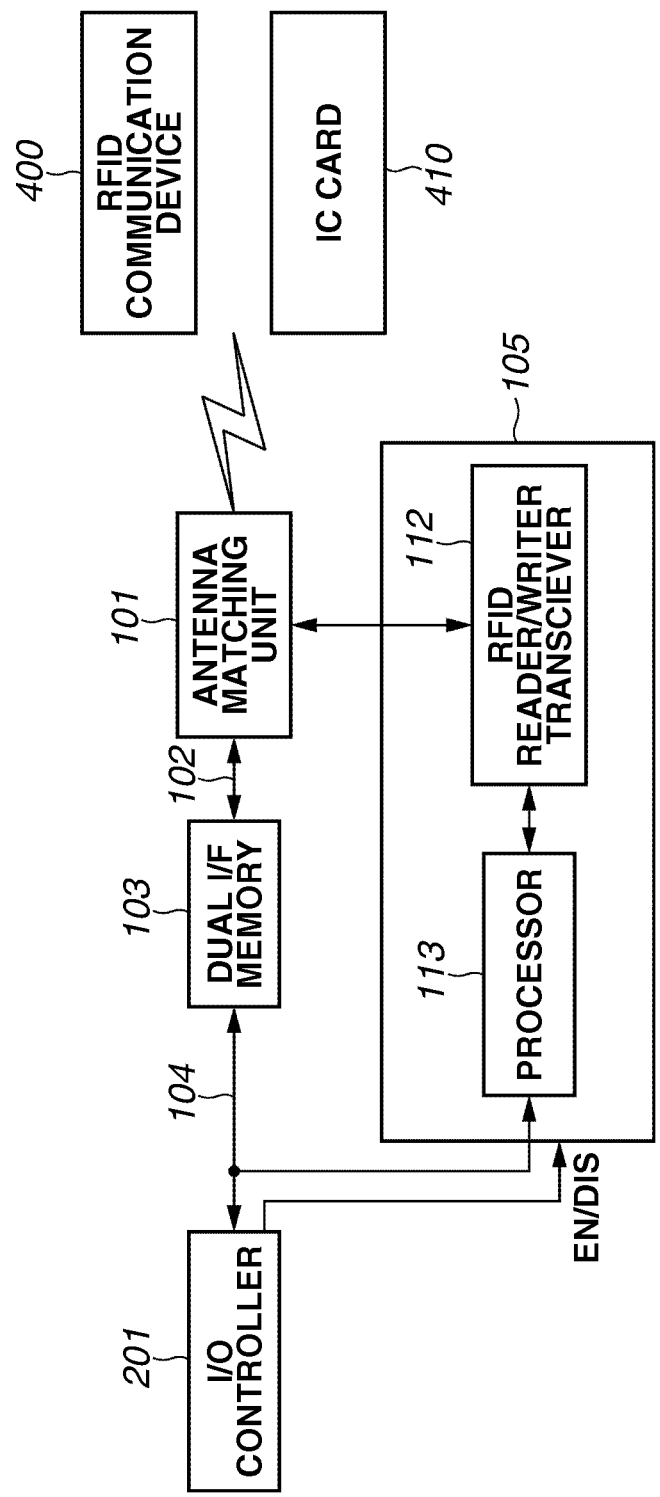
FIG. 2 is a block diagram illustrating an active wireless communication control unit in detail.

FIG. 2 is a block diagram illustrating the active wireless communication control unit 105 in detail. The active wireless communication control unit 105 includes an RFID reader/writer transceiver 112 and a processor 113.

The RFID reader/writer transceiver 112 communicates as a power supplying active type with the RFID communication device 400 via the antenna matching unit 101. Further, the RFID reader/writer transceiver 112 is connected to the processor 113. The processor 113 reads/writes data from the dual I/F memory 103, and transfers the data to the RFID reader/writer transceiver 112.

The I/O controller 201 transmits the enable/disable signal 106 for switching the operation mode (the active mode/the passive mode) to the active wireless communication control unit 105.

When the I/O controller 201 sets the signal 106 to "enable", the active wireless communication control unit 105 supplies power to the antenna matching unit 101, so that the RFID controller 100 performs active type RFID communication. In other words, the image forming apparatus 10 operates in the active mode.

On the other hand, when the I/O controller 201 sets the signal 106 to "disable", the active wireless communication control unit 105 does not supply power to the antenna matching unit 101, so that the RFID controller 100 performs passive type RFID communication. In other words, the image forming apparatus 10 operates in the passive mode. As the data flow in the passive type RFID communication, the data is transferred from the RFID communication device 400 to the antenna matching unit 101, and the data is read/written from/into the dual I/F memory 103 based on the RF protocol 102.

Figure 3:
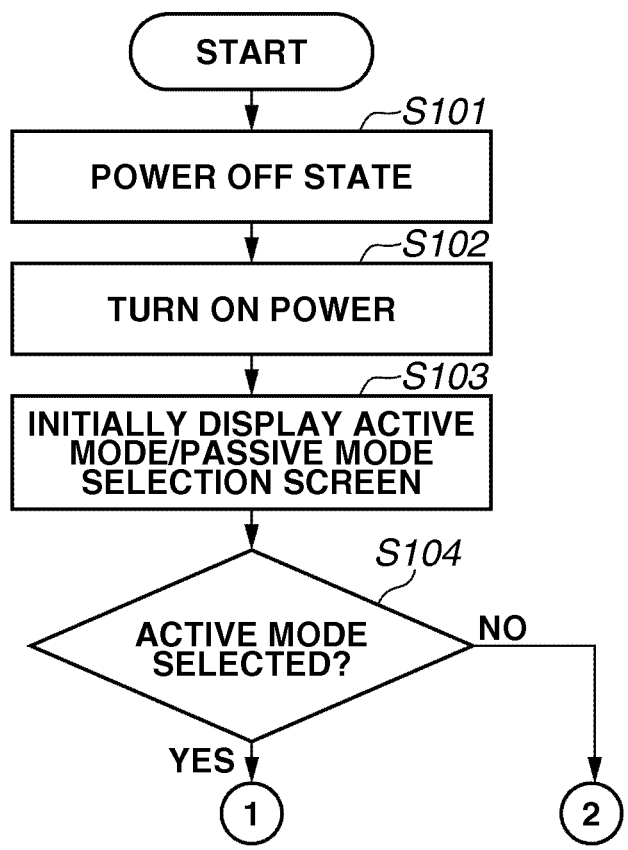
FIG. 3 is a flowchart illustrating an example of processing performed when the image forming apparatus starts.

FIG. 3 is a flowchart illustrating an example of processing performed when the image forming apparatus 10 starts. The processing performed in this flowchart is realized by the CPU 203 in the system controller 200 executing a program that is computer-readably recorded in the nonvolatile storage area of the memory 202.

In step S101, the image forming apparatus 10 is in a power off state. In step S102, the image forming apparatus 10 is turned on. Then, in step S103, if an RFID initial setting has not been set, the CPU 203 controls the user I/F 204 to display a screen (not illustrated) for selecting either the active mode or the passive mode.

In the active mode, the RFID reader/writer transceiver 112 autonomously transmits radio waves and communicates with the IC card 410. In this case, the IC card 410 is a device that does not include a power source and is powered using the radio waves transmitted from the RFID reader/writer transceiver 112 (i.e., a passive-type RFID). Further, in the passive mode, the RFID communication device 400 autonomously transmits radio waves, and the RFID controller 100 performs communication using the transmitted radio waves as power.

When the CPU 203 receives and detects a user selection operation made on the user I/F 204, the CPU 203 stores the selection as an RFID initial setting value in the nonvolatile storage area in the memory 202, and the CPU 203 advances the processing to step S104. An example of a case in which the RFID initial setting is not set is when the RFID initial setting value is not stored in the nonvolatile storage area in the memory 202.

If the RFID initial setting is set, in other words, if the RFID initial setting value is stored in the nonvolatile storage area in the memory 202, the CPU 203 skips the processing in step S103 and advances the processing to step S104.

In step S104, the CPU 203 determines whether the active mode is selected as the RFID initial setting based on the RFID initial setting value stored in the memory 202. If it is determined that the active mode is selected (YES in step S104), the CPU 203 advances the processing to step S201 in FIG. 4.

Figure 10:
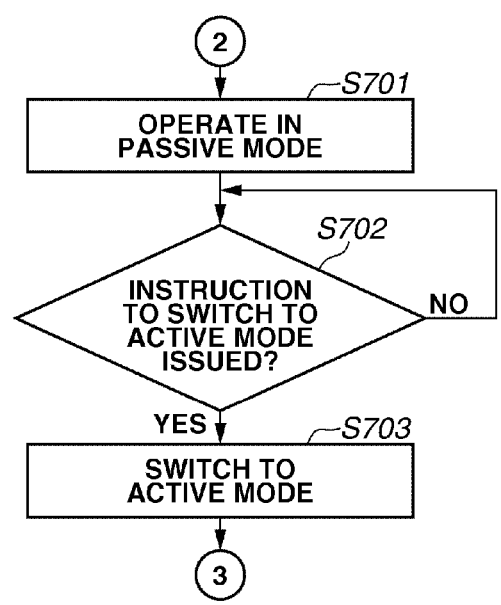
FIG. 10 is a flowchart illustrating an example of an operation performed when the image forming apparatus operates in a passive mode according to the first exemplary embodiment.

On the other hand, if it is determined that the active mode is not selected (NO in step S104) (i.e., the passive mode is selected), the CPU 203 advances the processing to step S701 in FIG. 10.

The operations performed when the image forming apparatus 10 operates in the active mode according to the first exemplary embodiment are described below with reference to FIGS. 4 to 9.

Figure 4:
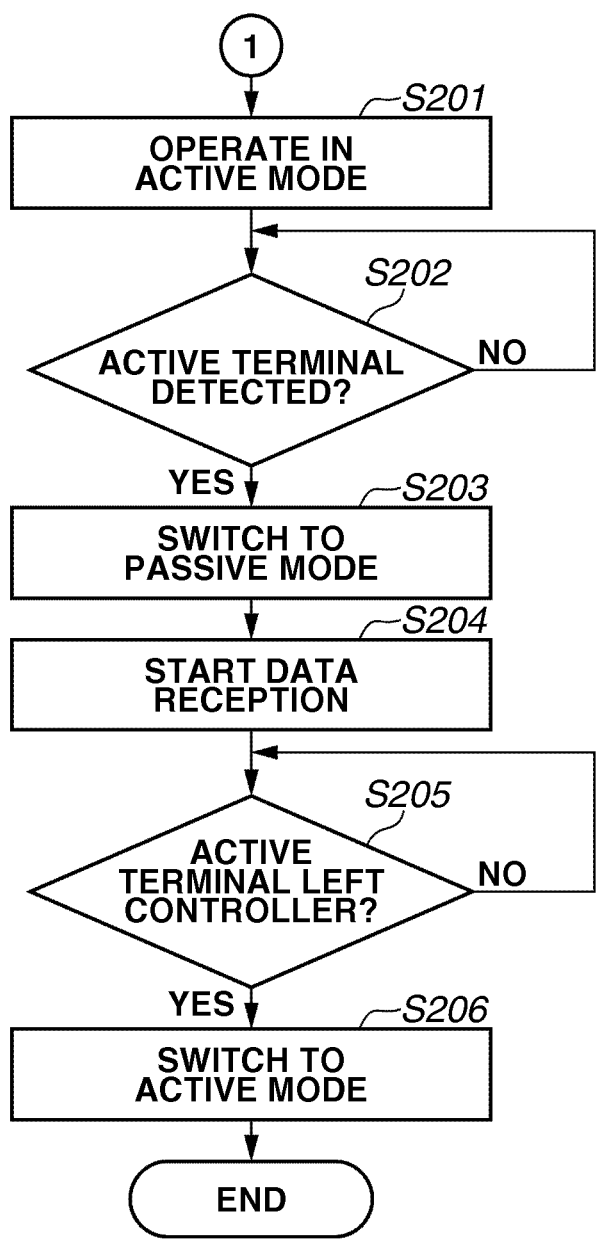
FIG. 4 is a flowchart illustrating an example of a first operation performed when the image forming apparatus operates in an active mode according to the first exemplary embodiment.

FIG. 4 is a flowchart illustrating an example of a first operation when the image forming apparatus 10 operates in the active mode according to the first exemplary embodiment. The processing performed in this flowchart is realized by the CPU 203 in the system controller 200 executing a program that is computer-readably recorded in the nonvolatile storage area of the memory 202.

In the processing illustrated in FIG. 4, it is assumed that, if the image forming apparatus 10 is in a normal mode (e.g., not a sleep mode), since the RFID controller 100 is operating in the active mode, if an IC card or the like that does not include a power source and operates as a passive type can be recognized, the RFID controller 100 is operated as is in the active mode. In addition, this example also assumes that a user uses the IC card 410 as a charge card, that the card is inserted from authentication until copying has finished, and that settlement is performed at the end. However, if the RFID communication device 400 operating as an active type tries to communicate with the RFID controller 100 operating in the active mode, communication is impossible due to radio wave interference. In this case, the RFID communication device 400 can communicate with the RFID controller 100 by switching the RFID controller 100 to the passive mode.

First, in step S201, the CPU 203 sets the signal 106 to "enable" and causes the active wireless communication control unit 105 to supply power to the antenna matching unit 101, so that the RFID controller 100 is actively operated. More specifically, the CPU 203 operates the image forming apparatus 10 in the active mode.

Next, in a state that the image forming apparatus 10 operates in the active mode (step S201), in step S202, the CPU 203 monitors the detection of an active terminal by polling the device ID of the actively operating RFID communication device 400 with the RFID reader/writer transceiver 112. At this point, the RFID reader/writer transceiver 112 acts as a detection unit for detecting radio waves from the actively operating RFID communication device 400.

If the device ID of the actively operating RFID communication device 400 can be read, in other words, if it is determined that an active terminal is detected (YES in step S202), the CPU 203 advances the processing to step S203.

In step S203, the CPU 203 sets the signal 106 to "disable" and stops the power supply from the active wireless communication control unit 105 to the antenna matching unit 101, so that the RFID controller 100 is switched to passive. More specifically, the CPU 203 switches the image forming apparatus 10 to the passive mode.

When switching to the passive mode, the RFID controller 100 can receive data. Consequently, in step S204, when data is transmitted by the actively operating RFID communication device 400, the RFID controller 100 starts data reception.

Then, in step S205, the CPU 203 monitors whether the actively operating RFID communication device 400 has moved away from the RFID controller 100. According to the present exemplary embodiment, the RFID controller 100 is configured so that when it is operating in the passive mode, a flag stored in the dual I/F memory 103 is turned ON when access from the actively operating RFID communication device 400 finishes. The CPU 203 performs polling on a value of the flag via the I2C protocol 104, and determines that the actively operating RFID communication device 400 has moved away from the RFID controller 100 (YES in step S205) if the flag is set to ON.

If it is determined that the actively operating RFID communication device 400 has moved away from the RFID controller 100 (YES in step S205), the CPU 203 advances the processing to step S206.

In step S206, the CPU 203 sets the signal 106 to "enable", and causes the active wireless communication control unit 105 to supply power to the antenna matching unit 101, so that the RFID controller 100 is switched to active. More specifically, the CPU 203 switches the image forming apparatus 10 to the active mode.

According to the above-described processing, when the image forming apparatus 10 is actively operating, and the RFID controller 100 detects that a hand-held type RFID communication device 400 being actively operated by a service person has approached the image forming apparatus 10, the RFID controller 100 is switched to a passive operation mode. Consequently, radio wave interference between the RFID controller 100 and the actively operating RFID communication device 400 can be prevented.

Thus, when the communication method of two devices is an RFID active type, by switching one of the RFID devices to a passive type, communication failure due to radio wave interference between the two RFID devices can be prevented, and the devices can communicate with each other.

In addition, when it is detected that a service person has moved a hand-held type RFID communication device 400 being actively operated away from the image forming apparatus 10 by a predetermined distance, the RFID controller 100 switches to an active operation mode, thereby enabling access to a passively operating IC card 410.

The RFID controller 100 can also be controlled so that it does not switch to the active mode, and remains operating in the passive mode, even if the actively operating RFID communication device 400 moves away from the RFID controller 100. More specifically, the processing in steps S205 and S206 may not to be executed.

Further, the CPU 203 can be configured to perform control to store predetermined data in the dual I/F memory 103 (a memory block that can be read from the RFID communication device 400 side) before performing the processing in step S203 in FIG. 4, i.e., immediately before switching the RFID controller 100 to the passive mode. The predetermined data may include, for example, a serial number of the image forming apparatus 10 body, or various setting information pieces such as user information, error information, log information, license information, counter information, charging information, consumables information, toner information, and network information, i.e., image forming apparatus 10 identification information, user information, and image forming apparatus 10 usage information. However, the predetermined data is not limited to these examples.

The license information indicates license information about an application program to be installed on the image forming apparatus 10. To prevent unauthorized use, some application programs need license information settings when the application programs are installed on the image forming apparatus. For example, the license information is issued by a license server by accessing the license server with a serial number or a license code.

An access right of the dual I/F memory 103 will be described. In the dual I/F memory 103, the storage areas in the dual I/F memory 103 can be handled as a plurality of memory blocks by combining, dividing, and specifying the storage areas in the dual I/F memory 103 based on control from the system controller 200 via the I2C protocol 104.

Further, the system controller 200 can set the access right for each memory block by control via the I2C protocol 104. More specifically, the access right (a read right/a write right) for access from the I2C side and access from the RFID can be set for each memory block. For example, the access right from the I2C side is set so that both reading and writing are permitted for all memory blocks. Further, the access right from the RFID side is set so that only reading is permitted for some of the memory blocks, and both reading and writing are permitted for the other memory blocks.

The CPU 203 can also be configured to perform processing for applying the setting information recorded in the dual I/F memory 103 to the image forming apparatus 10 when the RFID controller 100 returns to the active mode.

According to the above-described configuration, the RFID communication method in the image forming apparatus capable of switching between two RFID communication methods, the active mode and the passive mode, can be appropriately switched based on the situation. Consequently, radio wave interference can be avoided even when an actively operating RFID communication device 400 approaches the actively operating image forming apparatus 10, and information such as identification information and user information about the image forming apparatus 10 and usage information of the image forming apparatus 10 can be acquired and set in the image forming apparatus 10 using the RFID communication device 400.

Figure 5:
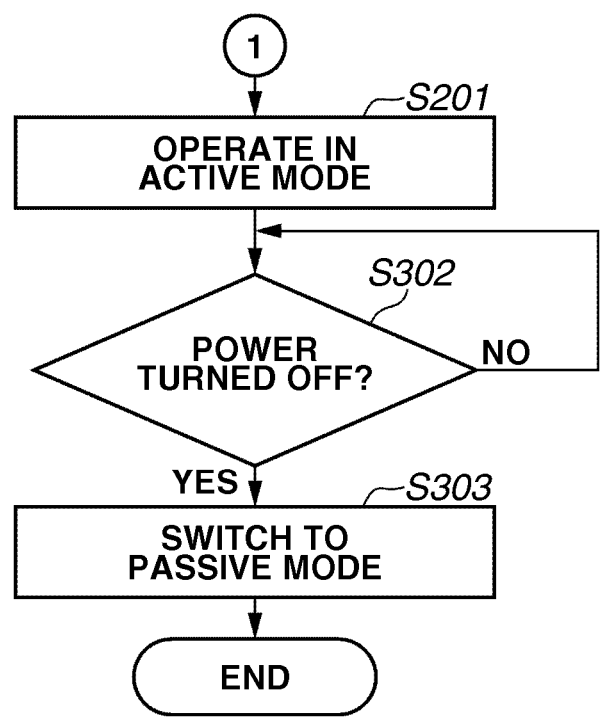
FIG. 5 is a flowchart illustrating an example of a second operation performed when the image forming apparatus operates in the active mode according to the first exemplary embodiment.

FIG. 5 is a flowchart illustrating an example of a second operation when the image forming apparatus 10 operates in the active mode according to the first exemplary embodiment. Steps that are identical with FIG. 4 are denoted with the same step number, and a description thereof is omitted here.

In the state that the image forming apparatus 10 operates in the active mode (step S201), in step S302, if the power of the image forming apparatus 10 body is turned off (YES in step S302), the power supply from the image forming apparatus 10 body to the RFID controller 100 stops. Consequently, in step S303, the power supply to the dual I/F memory 103 and the antenna matching unit 101 stops, and the RFID controller 100 switches to the passive mode. More specifically, the image forming apparatus 10 switches to the passive mode. The dual I/F memory 103 can communicate with the actively operating RFID communication device 400 even in a power off state.

Although the operations in steps S302 and S303 in FIG. 5 are not performed based on control by the CPU 203, the CPU 203 can be configured to control the operations in the following manner.

For example, the CPU 203 can monitor the switching of the image forming apparatus 10 body to the power off state, and control so that predetermined data like that described above is stored in the dual I/F memory 103 (a memory block that can be read from the RFID communication device 400) immediately before switching to the power off state. In addition, the CPU 203 can also control the RFID controller 100 to switch to the passive mode immediately before switching to the power off state. More specifically, the CPU 203 can control the image forming apparatus 10 to switch to the passive mode.

The CPU 203 can also be configured to perform processing for applying the setting information recorded in the dual I/F memory 103 to the image forming apparatus 10 when the image forming apparatus 10 body is turned to the power on state.

As described above, according to the present exemplary embodiment, information such as identification information and user information about the image forming apparatus 10 and usage information of the image forming apparatus 10 can be acquired and set in the image forming apparatus 10 using the actively operating RFID communication device 400, even when the image forming apparatus 10 body is in the power off state.

Figure 6:
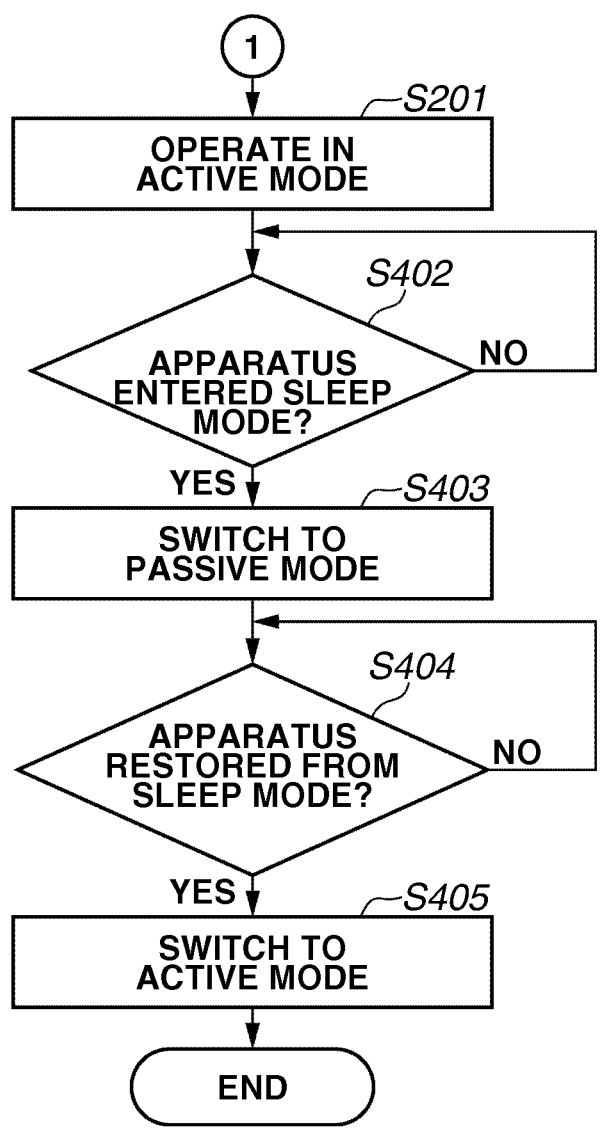
FIG. 6 is a flowchart illustrating an example of a third operation performed when the image forming apparatus operates in the active mode according to the first exemplary embodiment.

FIG. 6 is a flowchart illustrating an example of a third operation when the image forming apparatus 10 operates in the active mode according to the first exemplary embodiment. Steps that are identical with FIG. 4 are denoted with the same step number, and a description thereof is omitted here.

In step S201, the image forming apparatus 10 operates in the active mode. In step S402, if the image forming apparatus 10 body switches to a sleep mode (a power saving state) (YES in step S402), the power supply from the image forming apparatus 10 body to the RFID controller 100 stops. Consequently, in step S403, the power supply to the dual I/F memory 103 and the antenna matching unit 101 stops, and the RFID controller 100 switches to passive. More specifically, the image forming apparatus 10 switches to the passive mode. As described above, the dual I/F memory 103 can communicate with the actively operating RFID communication device 400 even in the power off state.

As the condition for switching to the sleep mode is when there has been no access to any of the user I/F 204, the RFID, or a network interface (not illustrated) for a predetermined duration, and the system controller 200 can set the predetermined duration.

Then in step S404, if the image forming apparatus 10 body returns from the sleep mode (YES in step S404), the power supply from the image forming apparatus 10 body to the RFID controller 100 is restarted. Consequently, in step S405, the power supply from the active wireless communication control unit 105 to the antenna matching unit 101 restarts, and the RFID controller 100 switches to active. More specifically, the image forming apparatus 10 switches to the active mode.

Although the operations from steps S402 to S405 in FIG. 6 are not performed based on control from the CPU 203, the CPU 203 can be configured to control the operations in the following manner.

For example, the CPU 203 can be configured to monitor the switching of the image forming apparatus 10 body to the sleep state and to perform control to store the predetermined data like that described above in the dual I/F memory 103 (a memory block that can be read from the 400) immediately before switching to the sleep mode, i.e., immediately before the RFID controller 100 switches to the passive mode. Further, the CPU 203 can control the RFID controller 100 to switch to passive (the image forming apparatus 10 switches to the passive mode) immediately before switching to the sleep mode. Further, when returning from the sleep mode, the CPU 203 can control the RFID controller 100 to switch to the active mode (the image forming apparatus 10 switches to the active mode).

The CPU 203 can also be configured to perform processing for applying the setting information recorded in the dual I/F memory 103 to the image forming apparatus 10 when the image forming apparatus 10 body returns from the sleep mode.

As described above, according to the present exemplary embodiment, information such as identification information and user information about the image forming apparatus 10 and usage information of the image forming apparatus 10 can be acquired and set in the image forming apparatus 10 using the actively operating RFID communication device 400, even when the image forming apparatus 10 body switches to the sleep mode.

Figure 7:
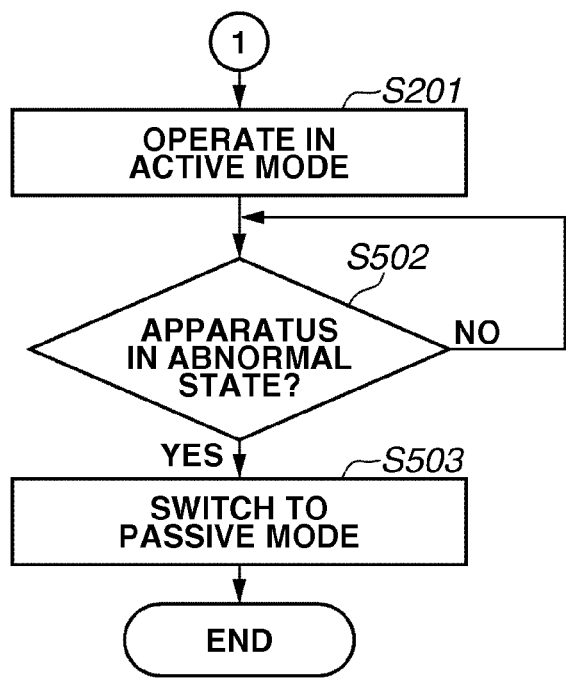
FIG. 7 is a flowchart illustrating an example of a fourth operation performed when the image forming apparatus operates in the active mode according to the first exemplary embodiment.

FIG. 7 is a flowchart illustrating an example of a fourth operation when the image forming apparatus 10 operates in the active mode according to the first exemplary embodiment. Steps that are identical with FIG. 4 are denoted with the same step number, and a description thereof is omitted here. The processing performed in this flowchart is realized by the CPU 203 in the system controller 200 executing a program that is computer-readably recorded in the nonvolatile storage area of the memory 202.

In step S201, the image forming apparatus 10 operates in the active mode. In step S502, the CPU 203 monitors whether the image forming apparatus 10 is in an abnormal state (failure state). An abnormal state is a state in which the image forming apparatus 10 has frozen, or a failure such as a system error has occurred in the image forming apparatus 10.

If it is determined that the image forming apparatus 10 is in the abnormal state (YES in step S502), the CPU 203 advances the processing to step S503. In step S503, the CPU 203 sets the signal 106 to "disable" to stop the power supply from the active wireless communication control unit 105 to the antenna matching unit 101, so that the RFID controller 100 switches to passive. More specifically, the CPU 203 switches the image forming apparatus 10 to the passive mode.

The CPU 203 can be configured to perform control to store the predetermined data like that described above in the dual I/F memory 103 (a memory block that can be read from the 400) immediately before performing the processing in step S503 in FIG. 7, i.e., immediately before the RFID controller 100 switches to the passive mode.

The CPU 203 can also be configured to perform processing for applying the setting information recorded in the dual I/F memory 103 to the image forming apparatus 10 when the abnormal state of the image forming apparatus 10 is resolved. Further, the CPU 203 can also be configured to switch the RFID controller 100 to active (switches the image forming apparatus 10 to the active mode).

During the abnormal state, the user I/F 204 cannot be operated, and the image forming apparatus 10 also cannot operate as a system. Therefore, the user cannot login to the image forming apparatus 10 even using the IC card 410. However, even in the abnormal state, information such as identification information and user information about the image forming apparatus 10 and usage information of the image forming apparatus 10 can be acquired and set in the image forming apparatus 10 by a service person or the like using a hand-held type RFID communication device 400 being actively operating.

Figure 8:
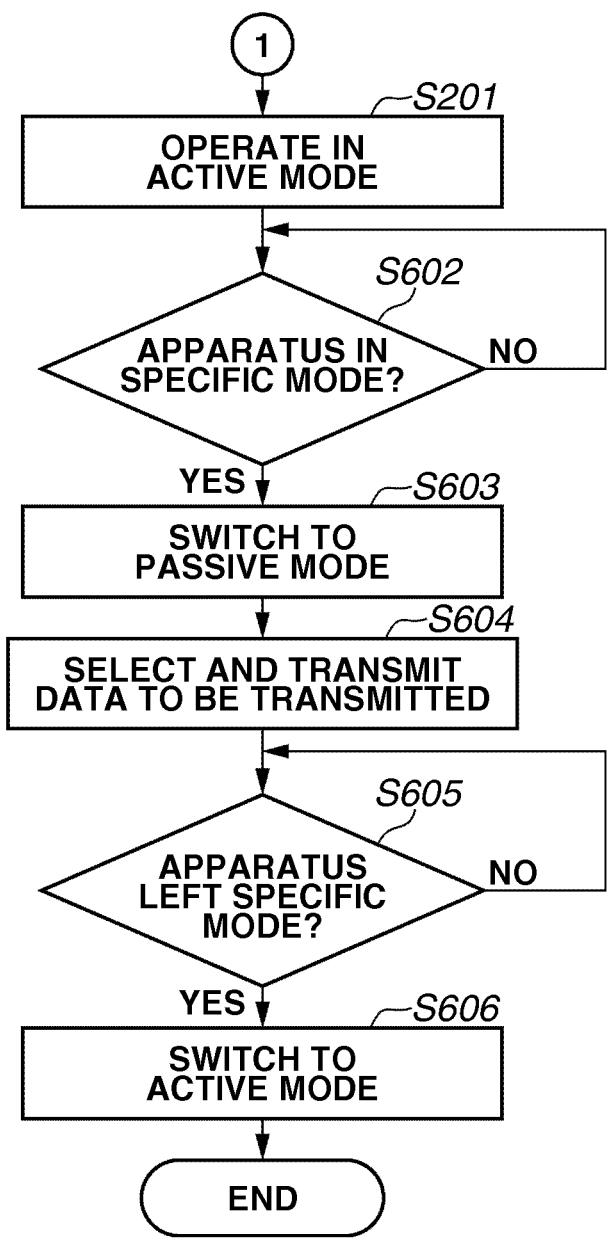
FIG. 8 is a flowchart illustrating an example of a fifth operation performed when the image forming apparatus operates in the active mode according to the first exemplary embodiment.

FIG. 8 is a flowchart illustrating an example of a fifth operation when the image forming apparatus 10 operates in the active mode according to the first exemplary embodiment. Steps that are identical with FIG. 4 are denoted with the same step number, and a description thereof is omitted here. The processing performed in this flowchart is realized by the CPU 203 in the system controller 200 executing a program that is computer-readably recorded in the nonvolatile storage area of the memory 202.

In step S201, the image forming apparatus 10 operates in the active mode. In step S602, the CPU 203 monitors whether the image forming apparatus 10 switches to a specific mode. A specific mode refers to, for example, a service mode used by a service person when maintaining the image forming apparatus 10. When an IC card approaches the actively operating image forming apparatus 10, data stored in that IC card is written in the dual I/F memory 103, and the CPU 203 can confirm from the IC card via the I/O controller 201. More specifically, the CPU 203 can detect the IC card.

If a user's electronic money card (IC card) is detected via the RFID controller 100, the CPU 203 performs charging processing or the like according to an operation. On the other hand, if a service person's IC card is detected, the CPU 203 displays a predetermined operation selection screen on the user I/F 204. When the CPU 203 detects that a switch to the specific mode is selected on the operation selection screen, the CPU 203 switches the image forming apparatus 10 to the specific mode. Charging processing refers to processing, for example, in which a print cost is settled using information about a remaining amount of electronic money stored in the user's electronic money card, or in which information about the settled amount (charging information) is recorded in the memory 202.

In step S602, if it is determined that the image forming apparatus 10 switched to the specific mode (YES in step S602), the CPU 203 advances the processing to step S603. In step S603, the CPU 203 sets the signal 106 to "disable" to stop the power supply from the active wireless communication control unit 105 to the antenna matching unit 101, so that the RFID controller 100 is switched to passive. More specifically, the CPU 203 switches the image forming apparatus 10 to the passive mode.

Further, although not illustrated in FIG. 8, the CPU 203 performs control so that counter information, charging information, consumables information, and toner information are read from the memory 202, and stored in different memory blocks in the dual I/F memory 103, immediately before the RFID controller 100 is switched to the passive mode (i.e., immediately before the processing in step S603).

Figure 9:
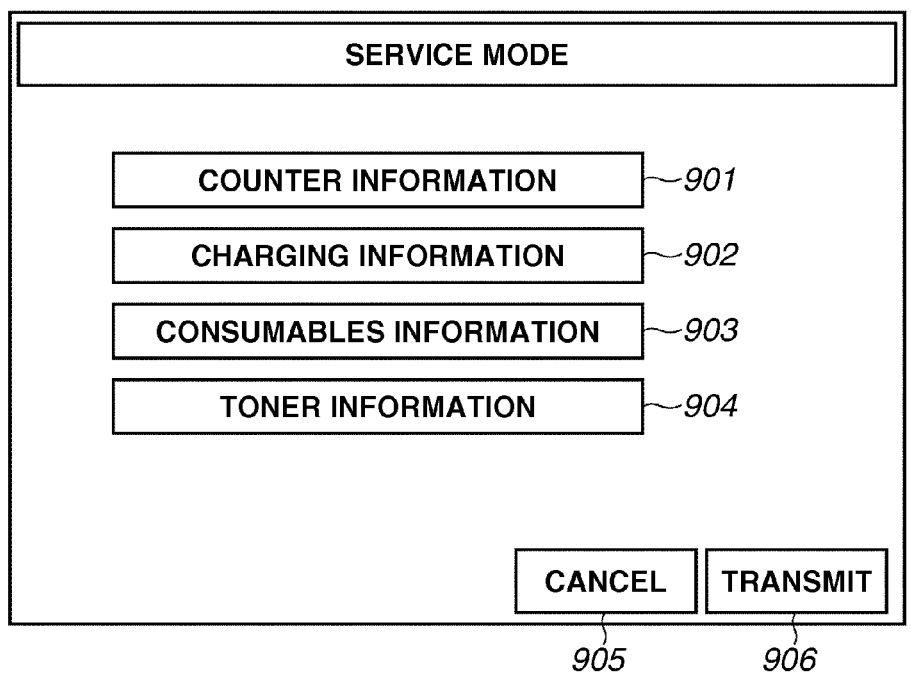
FIG. 9 illustrates an example of a service mode screen according to the first exemplary embodiment.

Next, the CPU 203 performs control to display a service mode screen as illustrated in FIG. 9 on the user I/F 204, and to receive an operation by the user to select the data to be externally transmitted via the user I/F 204.

FIG. 9 illustrates an example of the service mode screen according to the first exemplary embodiment. The service mode screen illustrated in FIG. 9 displays a counter information button 901 for selecting counter information as transmission data, a charging information button 902 for selecting charging information as the transmission data, a consumables information button 903 for selecting consumables information as the transmission data, and a toner information button 904 for selecting toner information as the transmission data. A plurality of these buttons can be simultaneously selected. The CPU 203 controls so that a background (e.g., background color) behind a selected button changes to let the user know that that button is selected.

When the service person selects at least one of the buttons 901 to 904 (e.g., the counter information button 901 and the charging information button 902), and presses a transmit button 906, the CPU 203 detects this operation, and, at step S604, performs processing (transmission processing) that enables the data corresponding to the selected button (here, the counter information and the charging information) to the actively operating RFID communication device 400.

In this processing, the CPU 203 controls the dual I/F memory so that the access right for the RFID side of the memory block in which the selected data is to be stored is permitted to read, and the access right for the RFID side of the memory block in which the data that is not selected is to be stored is not permitted to read. Consequently, the data in the memory block which is set to be read is read from the dual I/F memory 103 and transmitted to the RFID communication device 400 in response to a reading access from the actively operating RFID communication device 400.

When the user presses a cancel button 905, the CPU 203 detects this operation, closes the service mode screen (FIG. 9), and advances the processing to step S605. In step S605, the CPU 203 monitors whether the image forming apparatus 10 has left the specific mode. If it is determined that the image forming apparatus 10 has left the specific mode (YES in step S605), the CPU 203 advances the processing to step S606.

In step S606, the CPU 203 sets the signal 106 to "enable" to causes the active wireless communication control unit 105 to supply power to the antenna matching unit 101, so that the RFID controller 100 switches to active. More specifically, the CPU 203 switches the image forming apparatus 10 to the active mode.

Although in this example, the data pieces transmitted to the actively operating RFID communication device 400 in the specific mode are counter information, charging information, consumables information, and toner information, the data transmitted in the specific mode is not limited to these examples. For example, the data transmitted in the specific mode may include the serial number of the image forming apparatus 10 body, or various setting information pieces such as user information, error information, log information, license information, and network information.

The CPU 203 can also be configured to perform processing for applying the setting information recorded in the dual I/F memory 103 to the image forming apparatus 10 if it is determined that the image forming apparatus 10 body has left the specific mode.

As described above, according to the present exemplary embodiment, usage information of the image forming apparatus 10 can be acquired and various settings can be set in the image forming apparatus 10 in the specific mode using the actively operating RFID communication device 400.

Next, the processing performed when the image forming apparatus 10 operates in the passive mode according to the first exemplary embodiment is described with reference to FIGS. 10 and 11.

Figure 11:
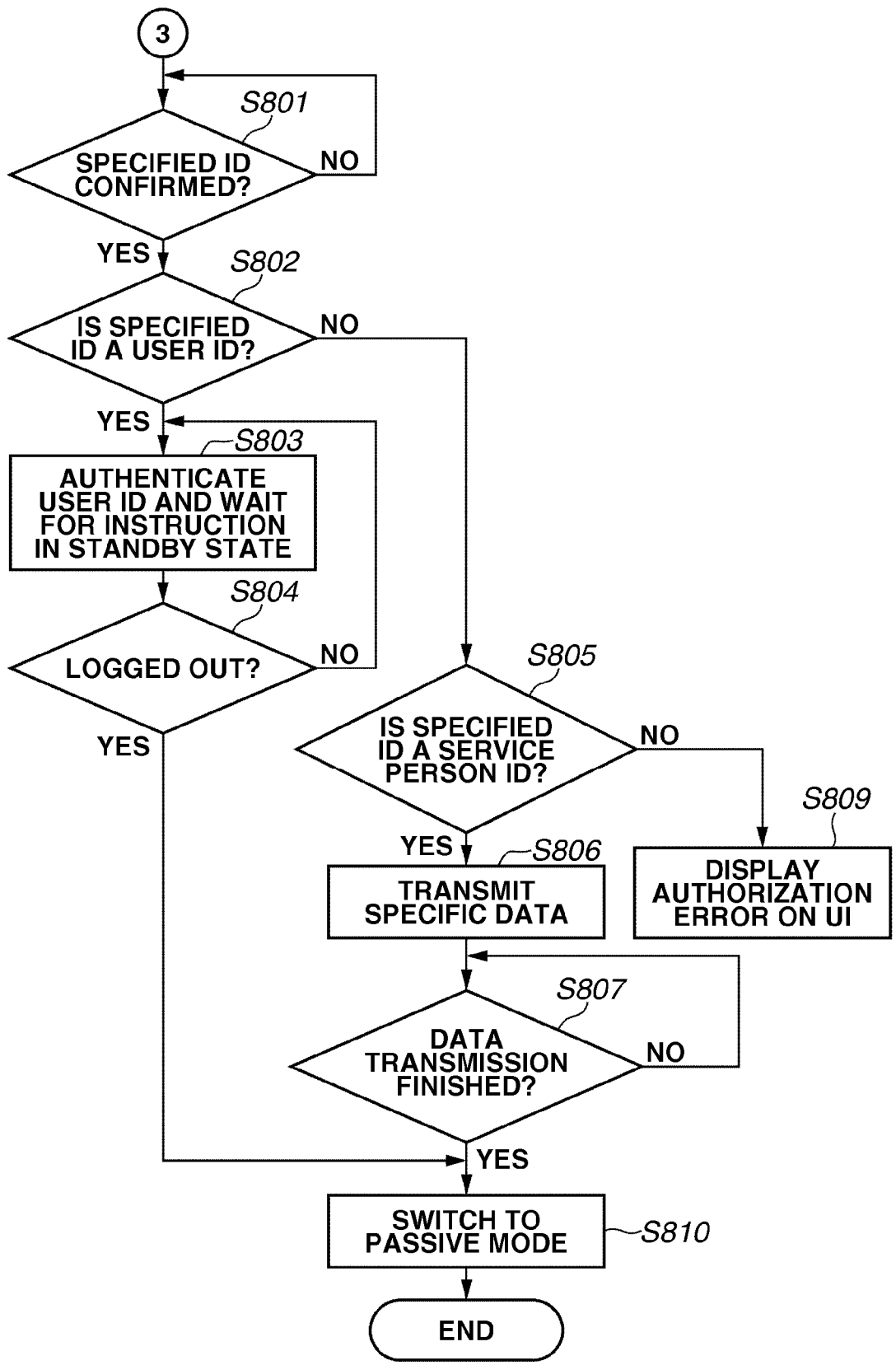
FIG. 11 is a flowchart illustrating an example of an operation performed when the image forming apparatus operates in the passive mode according to the first exemplary embodiment.

FIGS. 10 and 11 are flowcharts illustrating an example of an operation performed when the image forming apparatus 10 operates in the passive mode according to the first exemplary embodiment. The processing performed in these flowcharts is realized by the CPU 203 in the system controller 200 executing a program that is computer-readably recorded in the nonvolatile storage area of the memory 202.

First, in step S701, the CPU 203 sets the signal 106 to "disable" to stop the power supply from the active wireless communication control unit 105 to the antenna matching unit 101, so that the RFID controller 100 is operated in the passive mode.

Then, in a state that the image forming apparatus 10 operates in the passive mode (step S701), in step S702, the CPU 203 monitors whether a switching instruction to the active mode is issued. If it is determined that the switching instruction to the active mode is issued (YES in step S702), the CPU 203 advances the processing to step S703. The switching instruction to the active mode is issued by the user I/F 204 or by the RFID communication device 400 in the RFID communication.

In step S703, the CPU 203 sets the signal 106 to "enable" to supply power from the active wireless communication control unit 105 to the antenna matching unit 101, so that the RFID controller 100 is switched to active. More specifically, the CPU 203 switches the image forming apparatus 10 to the active mode.

Then, in the state operating in the active mode (step S703), in step S801, the CPU 203 monitors whether a specified ID can be confirmed in the data read from the passively operating IC card 410. As described above, in the active mode, a signal for wireless communication is transmitted from the antenna matching unit 101, and data is read from the passively operating IC card 410. The read data is written into the dual I/F memory 103, and the CPU 203 can confirm the data via the I/O controller 201.

If it is determined that the specified ID is confirmed (YES in step S801), the CPU 203 advances the processing to step S802. In step S802, the CPU 203 determines whether the specified ID that is confirmed in step S801 is a user ID. This example assumes a case in which a user passes the IC card 410 over the RFID controller 100 for authentication. If the ID read from the IC card 410 is a user ID registered in a nonvolatile storage area of the memory 202, for example, the user can log in to the image forming apparatus 10. The user ID can be, for example, identification information about the IC card registered for the user, or user identification information.

In addition to the user ID, the user IC card stores, for example, usage information of the image forming apparatus (e.g., number of printable sheets indicating the remaining number of sheets that can be printed, and data about the remaining amount of electronic money). Consequently, when the user IC card approaches the actively operating image forming apparatus 10, data such as the ID and usage information of the image forming apparatus can be written from the user IC card into the dual I/F memory 103, and confirmed by the CPU 203 via the I/O controller 201.

If it is determined that the specified ID is a user ID (YES in step S802), the CPU 203 advances the processing to step S803. In step S803, the CPU 203 performs user authentication using the user ID. If the authentication is successful, the CPU 203 permits use by the user (puts the user into a login state), and waits for an input of an operation instruction from the user I/F 204 in a standby state.

When an input of an operation instruction from the user I/F 204 is detected, the CPU 203 executes the processing according to the operation instruction, and advances the processing to step S804. For example, if a printing operation is instructed, the CPU 203 performs control to execute the instructed printing operation according to the number of printable sheets or the information about the remaining amount of the user that is confirmed via the dual I/F memory 103. Further, after printing is executed, the CPU 203 performs subtraction processing on the number of printable sheets or the information about the remaining amount in the dual I/F memory 103. Then, using the subtraction processing result, the CPU 203 performs control to update the number of printable sheets or the information about the remaining amount stored in the user IC card.

In step S804, the CPU 203 determines whether the user is logged out in response to an operation instruction from the user I/F 204. If it is determined that logout processing is not been performed (NO in step S804), the processing returns to step S803, and the CPU 203 waits for an input of an operation instruction from the user I/F 204 in the standby state.

On the other hand, if it is determined that logout processing is performed (YES in step S804), the CPU 203 advances the processing to step S810. In step S810, the CPU 203 sets the signal 106 to "disable" to stop the power supply from the active wireless communication control unit 105 to the antenna matching unit 101, so that the RFID controller 100 is switched to passive. More specifically, the CPU 203 switches the image forming apparatus 10 to the passive mode. In step S810 in FIG. 11, although the CPU 203 controls the image forming apparatus 10 to switch to the passive mode, the processing may also be controlled so that the image forming apparatus 10 waits as in the active mode.

If it is determined that the specified ID confirmed in step S801 is not a user ID (NO in step S802), the CPU 203 advances the processing to step S805. In step S805, the CPU 203 determines whether the specified ID is a service person ID registered in a nonvolatile storage area of the memory 202. This example assumes a case in which an IC card 410 of a service person is passed over the RFID controller 100.

If it is determined that the specified ID is a service person ID (YES in step S805), the CPU 203 advances the processing to step S806. In step S806, the CPU 203 performs control to store the specific data to be stored in the memory 202 in the dual I/F memory 103, and transmit the specific data stored in the dual I/F memory 103 to the IC card 410 confirmed in step S410. Examples of the specific data may include a serial number of the image forming apparatus 10 body, or various setting information pieces such as user information, error information, log information, license information, counter information, charging information, consumables information, toner information, and network information. However, the specific data pieces are not limited to these information pieces.

In step S807, the CPU 203 determines whether transmission of the specific data has finished. If it is determined that transmission of the specific data has not finished (NO in step S807), the CPU 203 waits until transmission of the specific data finishes.

If it is determined that transmission of the specific data has finished (YES in step S807), the CPU 203 advances the processing to step S810. In step S810, the CPU 203 switches the RFID controller 100 to the passive mode.

In step S805, if it is determined that the specified ID confirmed in step S801 is not a service person ID (NO in step S805), the CPU 203 determines that the ID is an unknown ID that is not registered, and the CPU 203 advances the processing to step S809. In step S809, the CPU 203 displays a message indicating an authentication error on the UI (user I/F 204).

As described above, the service person can switch the passively operating image forming apparatus 10 to active and store usage information and setting information about the image forming apparatus 10 in the IC card 410 of the service person.

According to the present exemplary embodiment, a configuration is described in which an image forming apparatus 10 started in the passive mode is switched to the active mode to execute the processing illustrated in FIG. 11. However, the present exemplary embodiment is not limited to switching to active after the apparatus has been started up in the passive mode. The CPU 203 can also be configured to execute the processing in each step in FIG. 11 in an actively operating state (e.g., the state illustrated in step S201 in FIGS. 4 to 8).

Thus, the image forming apparatus 10 according to the first exemplary embodiment can appropriately switch between two RFID communication methods (operation modes relating to the RFID wireless access), i.e., the active mode and the passive mode, according to the situation.

For example, when operating in the active mode state, the image forming apparatus 10 is configured to switch to the passive mode in at least any of the following cases: when the image forming apparatus 10 switches to a power saving state (sleep); when the image forming apparatus 10 is in an abnormal state (failure state); when the image forming apparatus 10 switches to a power off state; when an actively operating external device (RFID communication device 400) is detected; and when the operation mode of the image forming apparatus 10 switches to a specific mode (a service mode to be used during maintenance of the image forming apparatus).

Further, the image forming apparatus 10 is to switch to the active mode in at least any of the following cases: when the image forming apparatus 10 returns from the power saving state; when the image forming apparatus 10 recovers from the failure state; when an external device operating in the active mode is no longer detected; and when the image forming apparatus 10 returns from the specific mode.

Further, when operating in the active mode, the image forming apparatus 10 is configured so that when a user IC card 410 approaches, the ID (identification information of the IC card 410 or identification information of the user) and usage information of the image forming apparatus 10 (number of printable sheets or print cost information) from the IC card 410 are written in the dual I/F memory 103. According to the configuration, processing for logging in to the image forming apparatus, management of the number of sheets printed by the user, and charging processing can be realized using the user IC card.

In addition, the CPU 203 performs control, before the image forming apparatus 10 switches to the passive mode, to write at least any of various types of information about the image forming apparatus 10, such as failure information, counter information, and log information, in the dual I/F memory 103. According to the configuration, the acquisition of device information from the image forming apparatus 10 in the power off state, and the transfer of setting information to the image forming apparatus 10 in the power off state can be realized by bringing a mobile terminal (i.e., the RFID communication device 400) or the IC card 410 close to the image forming apparatus 10.

Figure 12:
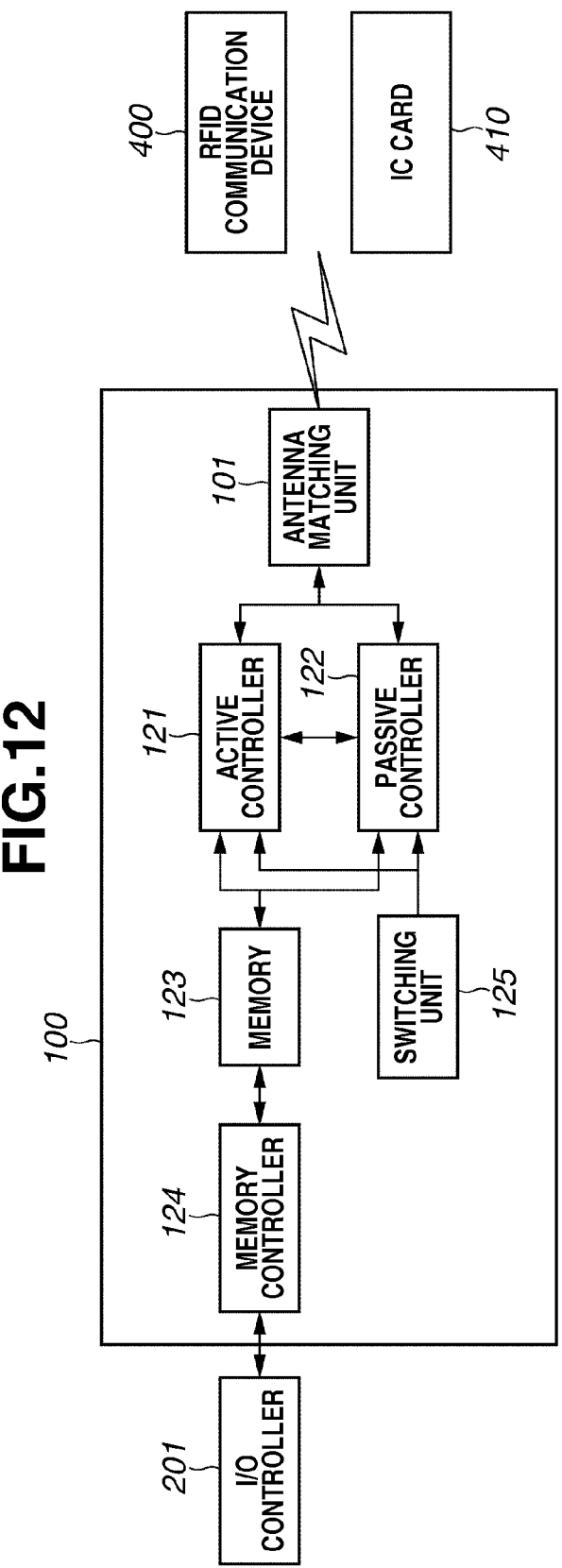
FIG. 12 is a block diagram illustrating an example of a configuration of an RFID controller according to a second exemplary embodiment.

FIG. 12 is a block diagram illustrating an example of a configuration of a RFID controller 100 according to a second exemplary embodiment.

As illustrated in FIG. 12, the RFID controller 100 according to the second exemplary embodiment includes an antenna matching unit 101, an active controller 121, a passive controller 122, a memory 123, a memory controller 124, and a switching unit 125. The memory 123 is a nonvolatile memory.

The active controller 121 reads/writes data from/into the memory 123, transmits radio waves via the antenna matching unit 101, and communicates with a passively operating IC card 410.

The passive controller 122 communicates with an actively operating RFID communication device 400 by receiving radio waves from the RFID communication device 400 via the antenna matching unit 101, and reads/writes data from/into the memory 123.

If it is determined that radio waves from the actively operating RFID communication device 400 are received when the RFID controller 100 is actively operating, the switching unit 125 controls the active controller 121 to stop the transmission of the radio waves and the passive controller 122 to be set to "valid". More specifically, the switching unit 125 switches the image forming apparatus 10 to the passive mode.

In addition, the switching unit 125 can be connected to the I/O controller 201, and the valid controller (active controller 121/passive controller 122) can be switched by the switching unit 125 according to control from the CPU 203 via the I/O controller 201.

In this configuration, when the RFID controller 100 is actively operating, the CPU 203 performs control to instruct the switching unit 125 to set the active controller 121 to invalid and the passive controller 122 to valid if it is determined that radio waves from the actively operating RFID communication device 400 is received.

Further, when the RFID controller 100 is actively operating, the CPU 203 monitors whether the image forming apparatus 10 is in an abnormal state, and if it is determined that the image forming apparatus 10 is in the abnormal state, the CPU 203 performs control to instruct the switching unit 125 to set the active controller 121 to invalid and the passive controller 122 to valid. More specifically, the CPU 203 switches the image forming apparatus 10 to the passive mode.

In addition, when the RFID controller 100 is actively operating, the CPU 203 monitors whether the image forming apparatus 10 is in a specific mode, and if it is determined that the image forming apparatus 10 is in the specific mode, the CPU 203 performs control to instruct the switching unit 125 to set the active controller 121 to invalid and the passive controller 122 to valid. More specifically, the CPU 203 switches the image forming apparatus 10 to the passive mode. Further, the CPU 203 displays the service mode screen (FIG. 9) on the user I/F 204, receives a selection from the user of the data to be transmitted, and performs processing for enabling the selected data to be transmitted to the actively operating RFID communication device 400. If it is determined that the image forming apparatus 10 has left the specific mode, the CPU 203 performs control to instruct the switching unit 125 to set the passive controller 122 to invalid and the active controller 121 to valid. More specifically, the CPU 203 switches the image forming apparatus 10 to the active mode.

In the second exemplary embodiment, when the image forming apparatus 10 body is in the power off state, the memory 123 cannot be accessed even from the actively operating RFID communication device 400. However, by performing the above-described control, when the image forming apparatus 10 body is in the power on state, similar to the first exemplary embodiment, even in the second exemplary embodiment the operation mode of the RFID controller 100 (operation mode of the image forming apparatus 10) can be appropriately switched, so that the similar effects to the first exemplary embodiment can be obtained.

The structure of the above-described various data pieces and the contents thereof are not limited to that described above. Obviously, various structures and contents may be employed according to the application and purpose. Further, any configuration of a combination of the above respective exemplary embodiments is also included in the aspect of the present invention.

Each process of the present invention is also realized by execution of software (program) acquired via a network or various storage media by a processing device (CPU, processor) of a personal computer (computer). The present invention is not limited to the above-described exemplary embodiments and various changes and modifications (including organic integration of the exemplary embodiments) can be applied so long as they fall within the scope of the present invention.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-194147 filed Sep. 6, 2011, which is hereby incorporated by reference herein in its entirety.

What is claimed is:

1. An image forming apparatus configured to print an image on a sheet, the image forming apparatus comprising:
   a wireless communicator including a memory and configured to execute wireless communication with an external apparatus;
   a controller configured to communicate with the memory and to set an operation mode of the image forming apparatus in either an active mode in which the wireless communicator supplies power to the external apparatus or a passive mode in which the wireless communicator is supplied with power from the external apparatus; and a detector configured to detect shifting of the image forming apparatus to a power off state in which power is not supplied to the image forming apparatus, wherein, in a case where the detector detects shifting of the image forming apparatus to the power off state, before switching to the power off state, the controller stores predetermined data into the memory of the wireless communicator, and switches the operation mode of the image forming apparatus from the active mode to the passive mode, wherein, in both of a case where the operation mode of the image forming apparatus is in the active mode and a case where the operation mode of the image forming apparatus is in the passive mode, the wireless communicator is configured to execute the wireless communication with the external apparatus, wherein the memory is configured such that the predetermined data stored in the memory can be read by the external apparatus, wherein, when the image forming apparatus is operating in the active mode, the detector is configured to detect whether the external apparatus is operating in an external apparatus active mode as an actively operating external apparatus or in an external apparatus passive mode as a passively operating external apparatus, and wherein, when the image forming apparatus is operating in the active mode, (i) the controller switches the operation mode of the image forming apparatus from the active mode to the passive mode if the detector detects that the external apparatus is operating in the external apparatus active mode, and (ii) the controller maintains the operation mode of the image forming apparatus in the active mode if the detector detects that the external apparatus is operating in the external apparatus passive mode, such that the wireless communicator is configured to execute the wireless communication with the external apparatus in both of the case where the operation mode of the image forming apparatus is in the active mode and the case where the operation mode of the image forming apparatus is in the passive mode.

2. The image forming apparatus according to claim 1, wherein the predetermined data is error information.

3. The image forming apparatus according to claim 1, wherein, when the operation mode of the image forming apparatus is in the active mode, the detector is configured to detect (i) an active external apparatus, (ii) the shifting of the image forming apparatus to the power off state, and configured to detect at least two of (iii) shifting of the image forming apparatus to a sleep mode in which power is not supplied, from the image forming apparatus, to the wireless communicator but is supplied, from the image forming apparatus, the controller, (iv) shifting of the image forming apparatus to an abnormal state mode in which an error has occurred in the image forming apparatus, and (v) shifting of the image forming apparatus to a specific mode used by a service person when maintaining the image forming apparatus, and wherein, in response to detecting any one of the active external apparatus, the power off state, the sleep mode, the abnormal state mode, and the specific mode, the controller switches the operation mode of the image forming apparatus from the active mode to the passive mode.

4. The image forming apparatus according to claim 1, further comprising at least one of a printer unit, a scanner unit, and a facsimile unit.

5. The image forming apparatus according to claim 1, wherein the image forming apparatus is a digital multifunction peripheral (MFP) and the external apparatus is detected as being one of an active radio-frequency identification (RFID) communication device and a passive integrated circuit (IC) card.

6. A method of controlling an image forming apparatus configured to print an image on a sheet and having a wireless communicator including a memory, the method comprising:

executing wireless communication with an external apparatus by the wireless communicator;

setting an operation mode of the image forming apparatus in either an active mode in which the wireless communicator supplies power to the external apparatus or a passive mode in which the wireless communicator is supplied with power from the external apparatus;

detecting shifting of the image forming apparatus to a power off state in which power is not supplied to the image forming apparatus; and in a case where shifting of the image forming apparatus to the power off state is detected, before switching to the power off state, storing predetermined data into the memory of the wireless communicator, and switching the operation mode of the image forming apparatus from the active mode to the passive mode, wherein, in both of a case where the operation mode of the image forming apparatus is in the active mode and a case where the operation mode of the image forming apparatus is in the passive mode, the wireless communicator executes the wireless communication with the external apparatus, wherein the predetermined data stored in the memory is read by the external apparatus, wherein, when the image forming apparatus is operating in the active mode, detecting includes detecting whether the external apparatus is operating in an external apparatus active mode as an actively operating external apparatus or in an external apparatus passive mode as a passively operating external apparatus, and wherein, when the image forming apparatus is operating in the active mode, (i) setting includes switching the operation mode of the image forming apparatus from the active mode to the passive mode if it is detected that the external apparatus is operating in the external apparatus active mode, and (ii) setting includes maintaining the operation mode of the image forming apparatus in the active mode if it is detected that the external apparatus is operating in the external apparatus passive mode, such that the wireless communicator is configured to execute the wireless communication with the external apparatus in both of the case where the operation mode of the image forming apparatus is in the active mode and the case where the operation mode of the image forming apparatus is in the passive mode.

7. A non-transitory computer readable storage medium on which is stored a computer program for causing a computer to execute a method of controlling an image forming apparatus configured to print an image on a sheet and having a wireless communicator including a memory, the method comprising:

executing wireless communication with an external apparatus by the wireless communicator;

setting an operation mode of the image forming apparatus in either an active mode in which the wireless communicator supplies power to the external apparatus or a passive mode in which the wireless communicator is supplied with power from the external apparatus;

detecting shifting of the image forming apparatus to a power off state in which power is not supplied to the image forming apparatus; and in a case where shifting of the image forming apparatus to the power off state is detected, before switching to the power off state, storing predetermined data into the memory of the wireless communicator, and switching the operation mode of the image forming apparatus from the active mode to the passive mode, wherein, in both of a case where the operation mode of the image forming apparatus is in the active mode and a case where the operation mode of the image forming apparatus is in the passive mode, the wireless communicator executes the wireless communication with the external apparatus, wherein the predetermined data stored in the memory is read by the external apparatus, wherein, when the image forming apparatus is operating in the active mode, detecting includes detecting whether the external apparatus is operating in an external apparatus active mode as an actively operating external apparatus or in an external apparatus passive mode as a passively operating external apparatus, and wherein, when the image forming apparatus is operating in the active mode, (i) setting includes switching the operation mode of the image forming apparatus from the active mode to the passive mode if it is detected that the external apparatus is operating in the external apparatus active mode, and (ii) setting includes maintaining the operation mode of the image forming apparatus in the active mode if it is detected that the external apparatus is operating in the external apparatus passive mode, such that the wireless communicator is configured to execute the wireless communication with the external apparatus in both of the case where the operation mode of the image forming apparatus is in the active mode and the case where the operation mode of the image forming apparatus is in the passive mode.

8. An image forming apparatus configured to print an image on a sheet, the image forming apparatus comprising:

a wireless communicator including a memory and configured to execute wireless communication with an external apparatus;

a controller configured to communicate with the memory and to set an operation mode of the image forming apparatus in either an active mode in which the wireless communicator supplies power to the external apparatus or a passive mode in which the wireless communicator is supplied with power from the external apparatus; and a detector configured to detect shifting of the image forming apparatus to a sleep state in which power is not supplied, from the image forming apparatus, to the wireless communicator, wherein, in a case where the detector detects shifting of the image forming apparatus to the sleep state, before switching to the sleep state, the controller stores predetermined data into the memory of the wireless communicator, and switches the operation mode of the image forming apparatus from the active mode to the passive mode, wherein, in both of a case where the operation mode of the image forming apparatus is in the active mode and a case where the operation mode of the image forming apparatus is in the passive mode, the wireless communicator is configured to execute the wireless communication with the external apparatus, wherein the memory is configured such that the predetermined data stored in the memory can be read by the external apparatus, wherein, when the image forming apparatus is operating in the active mode, the detector is configured to detect whether the external apparatus is operating in an external apparatus active mode as an actively operating external apparatus or in an external apparatus passive mode as a passively operating external apparatus, and wherein, when the image forming apparatus is operating in the active mode, (i) the controller switches the operation mode of the image forming apparatus from the active mode to the passive mode if the detector detects that the external apparatus is operating in the external apparatus active mode, and (ii) the controller maintains the operation mode of the image forming apparatus in the active mode if the detector detects that the external apparatus is operating in the external apparatus passive mode, such that the wireless communicator is configured to execute the wireless communication with the external apparatus in both of the case where the operation mode of the image forming apparatus is in the active mode and the case where the operation mode of the image forming apparatus is in the passive mode.

9. The image forming apparatus according to claim 8, wherein, in a case where the image forming apparatus returns from the sleep state, the controller switches the operation mode of the image forming apparatus from the passive mode to the active mode.

10. The image forming apparatus according to claim 8, wherein the predetermined data is error information.

11. A method of controlling an image forming apparatus configured to print an image on a sheet and having a wireless communicator including a memory, the method comprising:

executing wireless communication with an external apparatus by the wireless communicator;

setting an operation mode of the image forming apparatus in either an active mode in which the wireless communicator supplies power to the external apparatus or a passive mode in which the wireless communicator is supplied with power from the external apparatus;

detecting shifting of the image forming apparatus to a sleep state in which power is not supplied, from the image forming apparatus, to the wireless communicator; and in a case where shifting of the image forming apparatus to the sleep state is detected, before switching to the sleep state, storing predetermined data into the memory of the wireless communicator, and switching the operation mode of the image forming apparatus from the active mode to the passive mode, wherein, in both of a case where the operation mode of the image forming apparatus is in the active mode and a case where the operation mode of the image forming apparatus is in the passive mode, the wireless communicator executes the wireless communication with the external apparatus, wherein the predetermined data stored in the memory is read by the external apparatus, wherein, when the image forming apparatus is operating in the active mode, detecting includes detecting whether the external apparatus is operating in an external apparatus active mode as an actively operating external apparatus or in an external apparatus passive mode as a passively operating external apparatus, and wherein, when the image forming apparatus is operating in the active mode, (i) setting includes switching the operation mode of the image forming apparatus from the active mode to the passive mode if it is detected that the external apparatus is operating in the external apparatus active mode, and (ii) setting includes maintaining the operation mode of the image forming apparatus in the active mode if it is detected that the external apparatus is operating in the external apparatus passive mode, such that the wireless communicator is configured to execute the wireless communication with the external apparatus in both of the case where the operation mode of the image forming apparatus is in the active mode and the case where the operation mode of the image forming apparatus is in the passive mode.

12. A non-transitory computer readable storage medium on which is stored a computer program for causing a computer to execute a method of controlling an image forming apparatus configured to print an image on a sheet and having a wireless communicator including a memory, the method comprising:

executing wireless communication with an external apparatus by the wireless communicator;

setting an operation mode of the image forming apparatus in either an active mode in which the wireless communicator supplies power to the external apparatus or a passive mode in which the wireless communicator is supplied with power from the external apparatus;

detecting shifting of the image forming apparatus to a sleep state in which power is not supplied, from the image forming apparatus, to the wireless communicator;

in a case where shifting of the image forming apparatus to the sleep state is detected, before switching to the sleep state, storing predetermined data into the memory of the wireless communicator, and switching the operation mode of the image forming apparatus from the active mode to the passive mode, wherein, in both of a case where the operation mode of the image forming apparatus is in the active mode and a case where the operation mode of the image forming apparatus is in the passive mode, the wireless communicator executes the wireless communication with the external apparatus, wherein the predetermined data stored in the memory is read by the external apparatus, wherein, when the image forming apparatus is operating in the active mode, detecting includes detecting whether the external apparatus is operating in an external apparatus active mode as an actively operating external apparatus or in an external apparatus passive mode as a passively operating external apparatus, and wherein, when the image forming apparatus is operating in the active mode, (i) setting includes switching the operation mode of the image forming apparatus from the active mode to the passive mode if it is detected that the external apparatus is operating in the external apparatus active mode, and (ii) setting includes maintaining the operation mode of the image forming apparatus in the active mode if it is detected that the external apparatus is operating in the external apparatus passive mode, such that the wireless communicator is configured to execute the wireless communication with the external apparatus in both of the case where the operation mode of the image forming apparatus is in the active mode and the case where the operation mode of the image forming apparatus is in the passive mode.

* * * * *